(12) United States Patent
Beltz

(10) Patent No.: US 9,918,576 B1
(45) Date of Patent: Mar. 20, 2018

(54) EYEGLASS HOLDER AND ASSOCIATED USE THEREOF

(71) Applicant: Raymond Beltz, Willingboro, NJ (US)

(72) Inventor: Raymond Beltz, Willingboro, NJ (US)

( * ) Notice: Subject to any disclaimer, the term of this patent is extended or adjusted under 35 U.S.C. 154(b) by 0 days.

(21) Appl. No.: 15/343,811

(22) Filed: Nov. 4, 2016

Related U.S. Application Data

(60) Provisional application No. 62/250,731, filed on Nov. 4, 2015.

(51) Int. Cl.
    *A47K 1/08*     (2006.01)
    *A47G 29/08*     (2006.01)
    *F16M 13/02*     (2006.01)

(52) U.S. Cl.
    CPC ............ *A47G 29/08* (2013.01); *F16M 13/022* (2013.01)

(58) Field of Classification Search
    CPC ..... A45F 2200/0541; A45F 5/00; A45C 11/04
    See application file for complete search history.

(56) References Cited

U.S. PATENT DOCUMENTS

| | | | | |
|---|---|---|---|---|
| 5,947,322 A | * | 9/1999 | Ho | B65F 1/141 220/477 |
| 6,478,371 B1 | * | 11/2002 | Clarke | A47C 7/62 297/188.11 |
| D577,193 S | * | 9/2008 | Raile | D3/265 |

\* cited by examiner

*Primary Examiner* — Amy J. Sterling
(74) *Attorney, Agent, or Firm* — Najafi Law, PA; Ashkan Najafi

(57) ABSTRACT

An eyeglass holder is removably affixed to vertical and horizontal support surfaces. Such an eyeglass holder includes a rigid container suitably sized and shaped for removably receiving an existing eyeglass therein. The container has an exterior surface provided with a curvilinear outer region and a linear outer region contiguously mated with the curvilinear outer region. Notably, a portable fastener is removably affixed to the linear outer region of the exterior surface of the container.

14 Claims, 5 Drawing Sheets

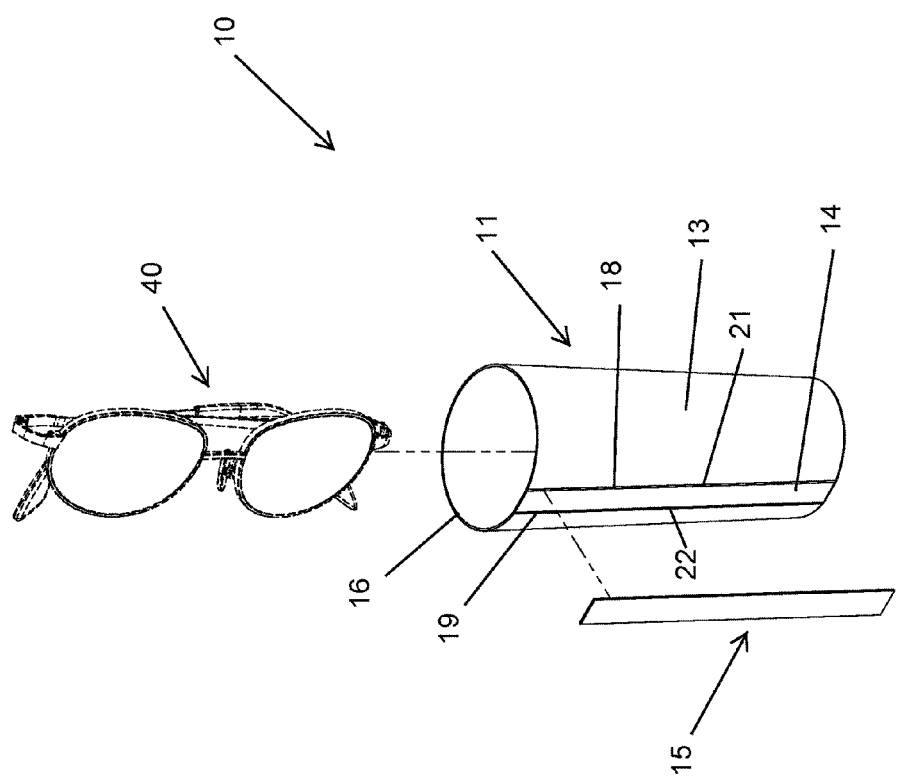

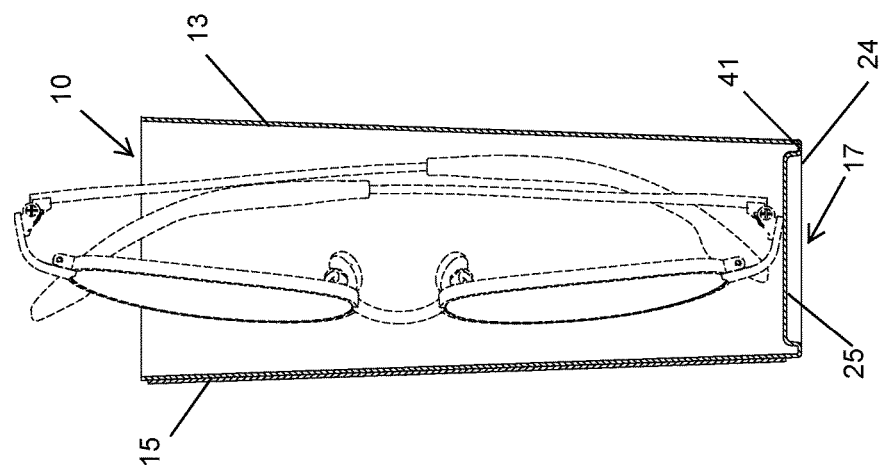
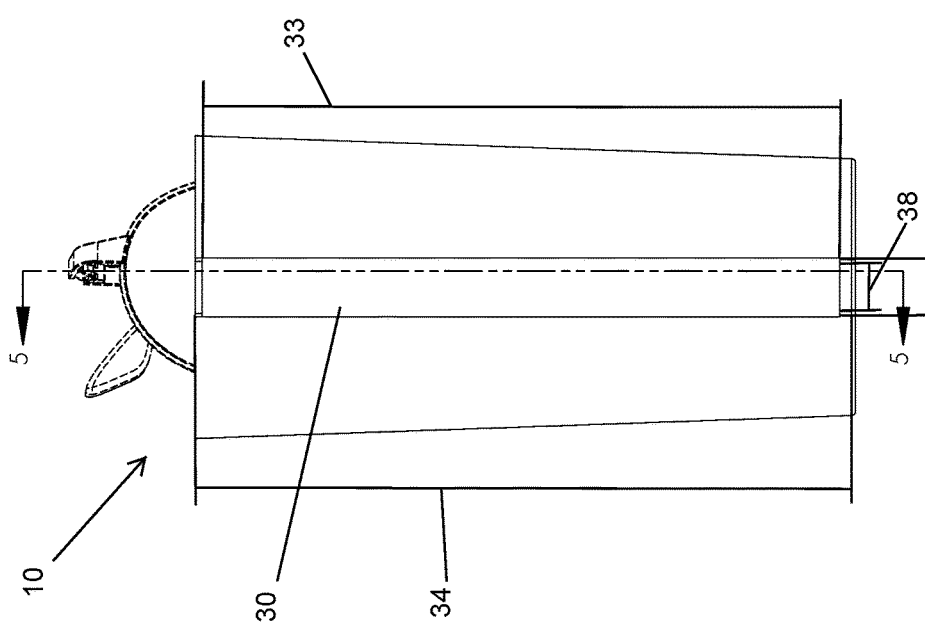

EYEGLASS HOLDER AND ASSOCIATED USE THEREOF

CROSS REFERENCE TO RELATED APPLICATIONS

This is a non-provisional patent application that claims the benefit of U.S. provisional patent application No. 62/250,731 filed Nov. 4, 2015, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to eyeglass holders and, more particularly, to a mountable, secure eyeglass holder that is easily applied to—and removed from—vertical or horizontal surfaces, such as a wall, a table, a desk, a vehicle dashboard, etc.

Prior Art

Every day, an astonishing number of Americans depend on corrective lenses to help them see well enough to complete their daily tasks. To improve their vision, these consumers are prescribed corrective eyewear, from practically invisible contact lenses to the more common external eyeglasses. In addition, many sight challenged individuals are very sensitive to bright sunlight, and don darkened, light-filtering sunglasses as a protective measure. Not limited to those with vision problems, sunglasses are quite ubiquitous. Whether as a means of blocking the sun or to express a fashion statement, sunglasses serve both a practical and aesthetic purpose for both the visually impaired and those with perfect sight.

While prescription glasses are necessary and sunglasses are convenient, use of these protective lenses is not without a drawback. Particularly, keeping up with a pair of eyeglasses or shades can be quite a challenge on hectic and busy days. Most bespectacled consumers remove their eyewear several times during the day, whether it is because they only need them for reading or they simply desire to rest their eyes. Setting the glasses aside, it is very easy for these lens wearers to be distracted by sudden demands of the job and home, and thus forget where they have set their glasses. As a result, a frustrating and time-consuming search can ensue to locate their needed vision enhancers.

In addition, placing glasses on a table top, desk, or similar surface puts them in a precarious position, as these expensive units could be inadvertently knocked to the floor and the lenses scratched, or worse, broken. Sunglasses aficionados face similar obstacles with keeping up with their eyewear. As repeated trips in and out of doors necessitate the frequent removal and replacing of shades, sunglass wearers often find they have misplaced, or left behind, these costly units.

Accordingly, a need remains for versatile eyeglass holder in order to overcome at least one aforementioned shortcoming. The exemplary embodiment(s) satisfy such a need by providing a mountable, secure eyeglass holder that is convenient and easy to use, lightweight yet durable in design, versatile in its applications, and designed for being easily applied to—and removed from—vertical or horizontal surfaces, such as a wall, a table, a desk, a vehicle dashboard, etc.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide an eyeglass holder for being removably affixed to vertical and horizontal support surfaces. These and other objects, features, and advantages of the non-limiting exemplary embodiment(s) are provided by an eyeglass holder including a rigid container suitably sized and shaped for removably receiving an existing eyeglass therein. The container has an exterior surface provided with a curvilinear outer region and a linear outer region contiguously mated with the curvilinear outer region. Notably, a portable fastener is removably affixed to the linear outer region of the exterior surface of the container.

In a non-limiting exemplary embodiment, the container includes an open proximal end and a closed distal end axially opposed therefrom. Each of the curvilinear outer region and the linear outer region extends from the open proximal end to the closed distal end.

In a non-limiting exemplary embodiment, the curvilinear outer region is disposed along a major circumferential surface area of the exterior surface. Such a curvilinear outer region has a starting edge and a terminating edge spaced therefrom along the exterior surface.

In a non-limiting exemplary embodiment, the linear outer region includes a centrally registered longitudinal axis, and first and second linear lateral edges equidistantly spaced from the centrally registered longitudinal axis.

In a non-limiting exemplary embodiment, the first and second linear lateral edges are monolithically coupled directly to each of the starting edge and the terminating edge of the curvilinear outer region.

In a non-limiting exemplary embodiment, the closed distal end includes an outermost circumferential edge, and an inner planar wall offset from the outermost circumferential edge.

In a non-limiting exemplary embodiment, the open proximal end has a first annular shape provided with a first diameter. The closed distal end has a second annular shape provided with a second diameter. Notably, the first diameter is greater than the second diameter.

In a non-limiting exemplary embodiment, the curvilinear outer region is entirely smooth and tapers inwardly from the open proximal end to the closed distal end.

In a non-limiting exemplary embodiment, the fastener includes an elongated planar strip having a longitudinal length shorter than a longitudinal length of the linear outer region. Notably, the fastener further has a latitudinal width greater than a latitudinal width of the linear outer region near the closed distal end of the container.

The present disclosure further includes a method of employing an eyeglass holder for being removably affixed to vertical and horizontal support surfaces. Such a method includes the steps of: obtaining an existing eyeglass; and obtaining a rigid container suitably sized and shaped for removably receiving the existing eyeglass therein. Notably, the container has an exterior surface provided with a curvilinear outer region and a linear outer region contiguously mated with the curvilinear outer region.

The method further includes the steps of: providing and removably affixing a portable fastener to the linear outer region of the exterior surface of the container; positioning the existing eyeglasses in the container; and removably affixing the fastener to a support surface.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

FIG. 3 is an exploded view of the eyeglass holder shown in FIG. 1;

FIG. 4 is a side elevational view of the eyeglass holder shown in FIG. 1;

FIG. 5 is a cross-sectional view taken along line 5-5 in FIG. 4.

Figure 1:
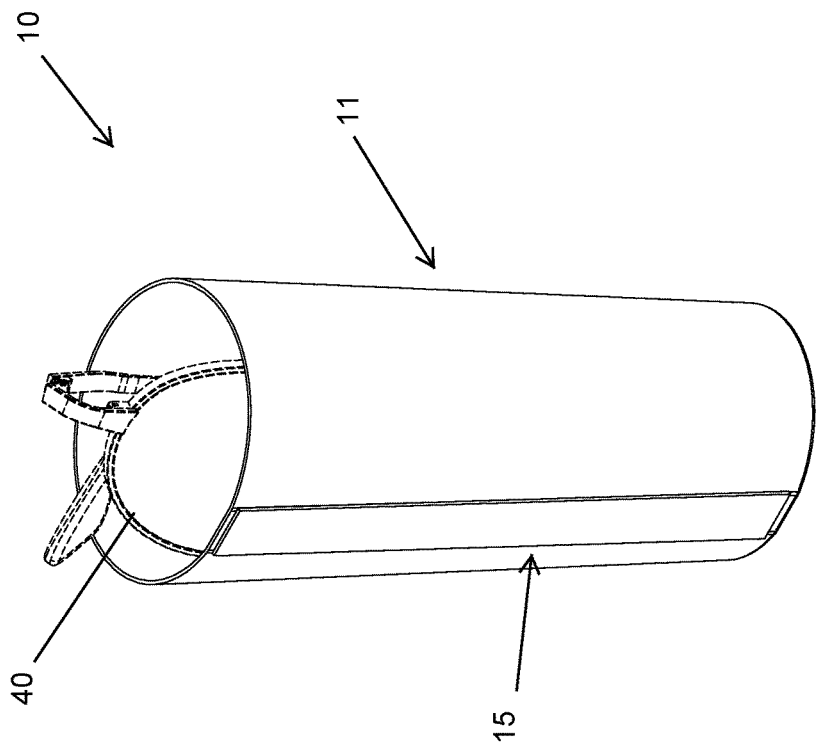
FIG. 1 is a perspective view of an eyeglass holder having a pair of eyeglasses contained therein, in accordance with a non-limiting exemplary embodiment.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about" means approximately or nearly and in the context of a numerical value or range set forth means±15% of the numerical.

If used herein, "substantially" means largely if not wholly that which is specified but so close that the difference is insignificant.

Figure 2:
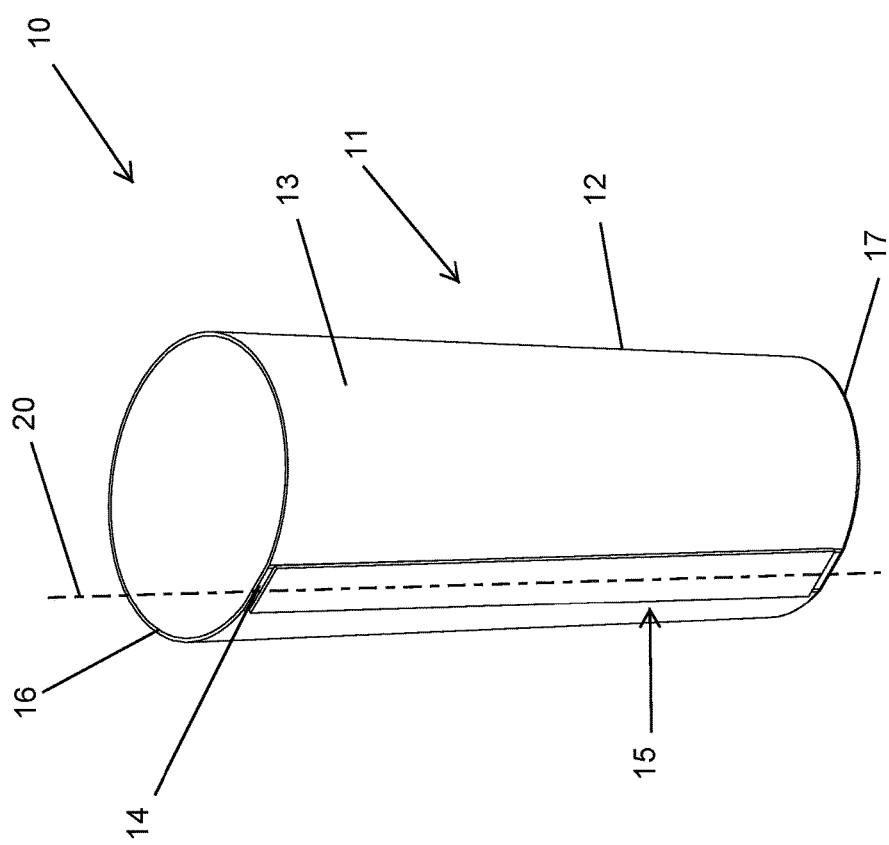
FIG. 2 is a perspective view of the eyeglass holder shown in FIG. 1 without the eyeglasses.
Figure 6:
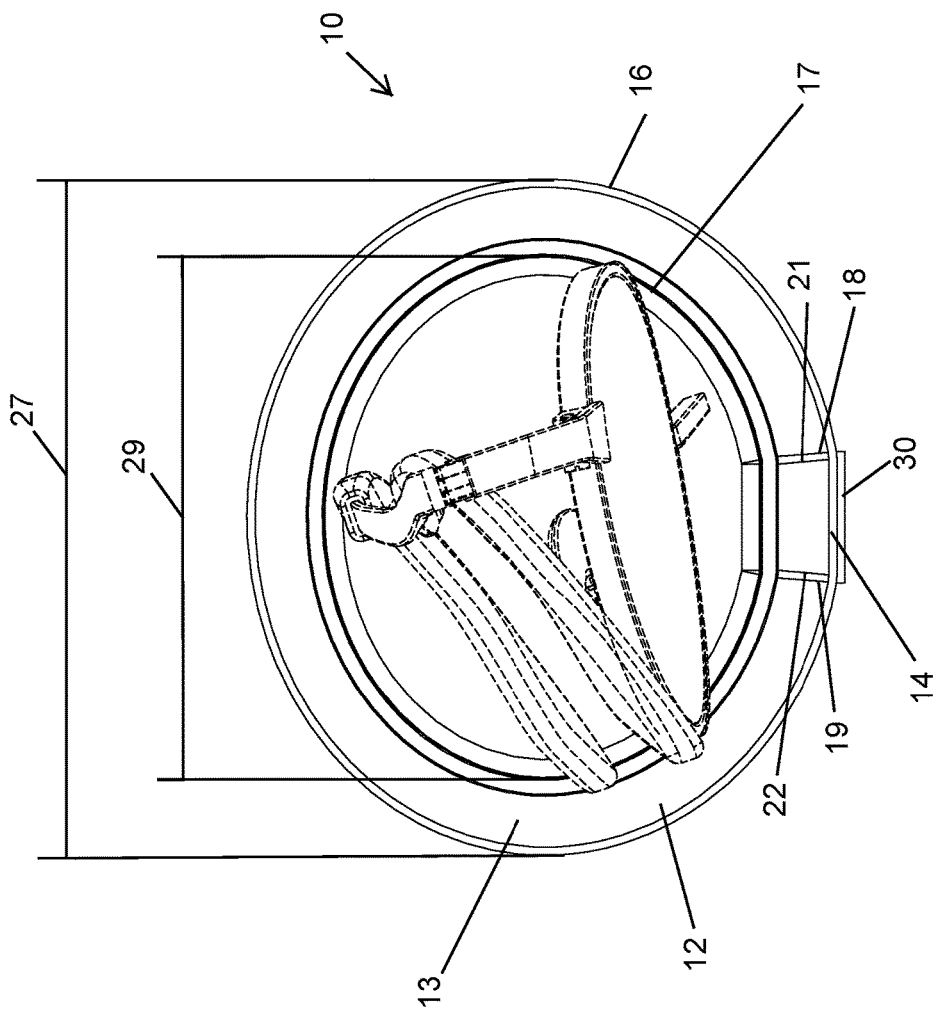
FIG. 6 is a top plan view of the eyeglass holder shown in FIG. 1.

A non-limiting exemplary embodiment of the present disclosure is referred to generally in FIGS. 1-6 and is intended to provide a mountable, secure eyeglass holder 10 that is easily applied to—and removed from—vertical or horizontal surfaces, such as a wall, a table, a desk, a vehicle dashboard, etc. It should be understood that the exemplary embodiment may be used to hold a variety of eyeglasses 40, and should not be limited to any particular eyeglass described herein.

The non-limiting exemplary embodiment(s) is/are referred to generally in FIGS. 1-6 and is/are intended to provide an eyeglass holder 10 for being removably affixed to vertical and horizontal support surfaces. Such an eyeglass holder 10 includes a rigid container 11 suitably sized and shaped for removably receiving an existing eyeglass therein. The container 11 has an exterior surface 12 provided with a curvilinear outer region 13 and a linear outer region 14 contiguously mated with the curvilinear outer region 13. Notably, a portable fastener 15 is removably affixed to the linear outer region 14 of the exterior surface 12 of the container 11. Such a portable fastener 15 advantageously secures container 11 to a variety of support surfaces and maintains container 11 at a substantially stable position so that eyeglasses 40 do not fall out.

In a non-limiting exemplary embodiment, the container 11 includes an open proximal end 16 and a closed distal end 17 axially opposed therefrom. Each of the curvilinear outer region 13 and the linear outer region 14 extends from the open proximal end 16 to the closed distal end 17. Such a structural configuration ensures the fastener 15 remains securely affixed to exterior surface 12.

In a non-limiting exemplary embodiment, the curvilinear outer region 13 is disposed along a major circumferential surface area of the exterior surface 12. Such a curvilinear outer region 13 has a starting edge 18 and a terminating edge 19 spaced therefrom along the exterior surface 12. Such edges 18, 19 are linear to ensure a suitable transition is made to linear outer region 14.

In a non-limiting exemplary embodiment, the linear outer region 14 includes a centrally registered longitudinal axis 20, and first and second linear lateral edges 21, 22 equidistantly spaced from the centrally registered longitudinal axis 20. Such lateral edges 21, 22 are linear to ensure a suitable transition is made to edges 18, 19.

In a non-limiting exemplary embodiment, the first and second linear lateral edges 21, 22 are monolithically coupled directly to each of the starting edge 18 and the terminating edge 19 of the curvilinear outer region 13. The linear configuration of such components ensures the fastener 15 is supported on a continuous flat and planar surface of linear outer region 14.

In a non-limiting exemplary embodiment, the closed distal end 17 includes an outermost circumferential edge 24, and an inner planar wall 25 offset from the outermost circumferential edge 24. Such an inner planar wall 25 is raised and thereby provided a circumferential shoulder 41 extending along an entire inner diameter of container 11.

In a non-limiting exemplary embodiment, the open proximal end 16 has a first annular shape provided with a first diameter 27. The closed distal end 17 has a second annular shape provided with a second diameter 29. Notably, the first diameter 27 is greater than the second diameter 29. This tapered shaped provided a suitable configuration for maintaining the eyeglasses 40 at a substantially stable position inside container 11.

In a non-limiting exemplary embodiment, the curvilinear outer region 13 is entirely smooth and tapers inwardly from the open proximal end 16 to the closed distal end 17. Thus, the width of linear outer region 14 is less than the width thereof near the open proximal end 16.

In a non-limiting exemplary embodiment, the fastener 15 includes an elongated planar strip 30 having a longitudinal length 33 shorter than a longitudinal length 34 of the linear outer region 14. Notably, the fastener 15 further has a uniform latitudinal width 37 greater than a tapered latitudinal width 38 of the linear outer region 14, near closed distal end 17 of container 11.

The present disclosure further includes a method of employing an eyeglass holder 10 for being removably affixed to vertical and horizontal support surfaces. Such a method includes the steps of: obtaining an existing eyeglass; and obtaining a rigid container 11 suitably sized and shaped for removably receiving the existing eyeglass therein. Notably, the container 11 has an exterior surface 12 provided with a curvilinear outer region 13 and a linear outer region 14 contiguously mated with the curvilinear outer region 13.

The method further includes the steps of: providing and removably affixing a portable fastener 15 to the linear outer region 14 of the exterior surface 12 of the container 11; positioning the existing eyeglasses 40 in the container 11; and removably affixing the fastener 15 to a support surface.

Referring to FIGS. 1-6 in general, in a non-limiting exemplary embodiment(s), this product is a receptacle for eyewear that is easily adhered to a variety of surfaces, providing a secure focal point that ensures the glasses are always within sight and reach. The eyeglass holder 10 is presented as a cylindrical container 11 fashioned from a durable plastic or acrylic material. Measuring approximately four and one-half inches (4.5") in length and one and one half inches (1½") in diameter (e.g., an oval shape), the eyeglass holder 10 may be sized appropriately for virtually any type of lens wear. One end of the receptacle may be enclosed, while the opposite may be open to accept a pair of glasses within the container 11.

The holder 10 may be provided with strong adhesive strips, akin to 3M® COMMAND STRIPS™, which advantageously allows the holder 10 to be secured to any vertical or horizontal surface, such as a wall, a table, a desk, or a vehicle dashboard, to name just a few of the many possibilities. As such, one need only keep the compact and lightweight eyeglass holder 10 on the person, whether in a packet, purse, or backpack. Should the user remove the eyeglasses 40, he or she may adhere the receptacle to the closest flat surface, and slip the lenses inside. Should the user momentarily forget about the lenses, one glance at where they were sitting may reveal the eyeglass holder 10. For personalization as well as improved visibility, this holder 10 may be made available in an array of striking colors and designs.

A highly versatile product, the eyeglass holder 10 provides prescription lens, reading, and sunglasses wearers with a convenient and effective means of keeping track of their eyewear. Eliminating the need to fruitlessly search for a pair of glasses or shades during busy days, this handy device allows users to keep their glasses near the person. In this manner, consumers also avoid leaving behind expensive sunglasses or scratching and breaking costly prescription lenses. The clever adhesive configuration allows the lenses to be secured and retrieved in seconds when needed. In addition, the sleek, lightweight construction is conveniently portable.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. An eyeglass holder for being removably affixed to vertical and horizontal support surfaces, said eyeglass holder comprising:
   a container suitably sized and shaped for removably receiving an existing eyeglass therein, said container having an exterior surface provided with a curvilinear outer region and a linear outer region contiguously mated with said curvilinear outer region; and
   a fastener removably affixed to said linear outer region of said exterior surface of said container;
   wherein said container comprises an open proximal end and a closed distal end axially opposed therefrom, each of said curvilinear outer region and said linear outer region beginning from said open proximal end and terminating at said closed distal end;
   wherein said fastener comprises an elongated planar strip having a longitudinal length shorter than a longitudinal length of said linear outer region, said fastener further having a latitudinal width greater than a latitudinal width of said linear outer region near said closed distal end of said container;
   wherein said fastener includes
      a planar, smooth, and continuous entire outer surface exposed to an ambient environment, and
      a planar, smooth, and continuous entire inner surface directly engaged with an outermost surface of said linear outer region;
   wherein said fastener is portable and provided with a uniform width extending along an entire longitudinal length thereof;
   wherein each of said linear outer region and said fastener are entirely solid and continuous along an entire longitudinal length thereof.

2. The eyeglass holder of claim 1, wherein said curvilinear outer region is disposed along a major circumferential surface area of said exterior surface, said curvilinear outer region having a starting edge and a terminating edge spaced therefrom along said exterior surface.

3. The eyeglass holder of claim 2, wherein said linear outer region comprises:
   a centrally registered longitudinal axis; and
   first and second linear lateral edges equidistantly spaced from said centrally registered longitudinal axis.

4. The eyeglass holder of claim 3, wherein said first and second linear lateral edges are monolithically coupled directly to each of said starting edge and said terminating edge of said curvilinear outer region.

5. The eyeglass holder of claim 1, wherein said closed distal end comprises:
   an outermost circumferential edge; and
   an inner planar wall offset from said outermost circumferential edge.

6. The eyeglass holder of claim 5, wherein said open proximal end has a first annular shape provided with a first diameter, said closed distal end having a second annular shape provided with a second diameter, wherein said first diameter is greater than said second diameter.

7. The eyeglass holder of claim 2, wherein said curvilinear outer region is entirely smooth and tapers inwardly from said open proximal end to said closed distal end.

8. An eyeglass holder for being removably affixed to vertical and horizontal support surfaces, said eyeglass holder comprising:
   a rigid container suitably sized and shaped for removably receiving an existing eyeglass therein, said container having an exterior surface provided with a curvilinear outer region and a linear outer region contiguously mated with said curvilinear outer region; and
   a portable fastener removably affixed to said linear outer region of said exterior surface of said container;
   wherein said container comprises an open proximal end and a closed distal end axially opposed therefrom, each of said curvilinear outer region and said linear outer region beginning from said open proximal end and terminating at said closed distal end;
   wherein said fastener comprises an elongated planar strip having a longitudinal length shorter than a longitudinal length of said linear outer region, said fastener further having a latitudinal width greater than a latitudinal width of said linear outer region near said closed distal end of said container;
   wherein said fastener includes
      a planar, smooth, and continuous entire outer surface exposed to an ambient environment, and
      a planar, smooth, and continuous entire inner surface directly engaged with an outermost surface of said linear outer region;
   wherein said fastener is portable and provided with a uniform width extending along an entire longitudinal length thereof;
   wherein each of said linear outer region and said fastener are entirely solid and continuous along an entire longitudinal length thereof.

9. The eyeglass holder of claim 8, wherein said curvilinear outer region is disposed along a major circumferential surface area of said exterior surface, said curvilinear outer region having a starting edge and a terminating edge spaced therefrom along said exterior surface.

10. The eyeglass holder of claim 9, wherein said linear outer region comprises:
    a centrally registered longitudinal axis; and
    first and second linear lateral edges equidistantly spaced from said centrally registered longitudinal axis.

11. The eyeglass holder of claim 10, wherein said first and second linear lateral edges are monolithically coupled directly to each of said starting edge and said terminating edge of said curvilinear outer region.

12. The eyeglass holder of claim 8, wherein said closed distal end comprises:
    an outermost circumferential edge; and
    an inner planar wall offset from said outermost circumferential edge.

13. The eyeglass holder of claim 12, wherein said open proximal end has a first annular shape provided with a first diameter, said closed distal end having a second annular shape provided with a second diameter, wherein said first diameter is greater than said second diameter.

14. The eyeglass holder of claim 9, wherein said curvilinear outer region is entirely smooth and tapers inwardly from said open proximal end to said closed distal end.

* * * * *